United States Patent
Tener et al.

(10) Patent No.: US 7,858,939 B2
(45) Date of Patent: Dec. 28, 2010

(54) FPA COMBINING SAL AND IMAGING

(75) Inventors: Gene D. Tener, Oviedo, FL (US); Mark Goodnough, Santa Ynez, CA (US); David J. Puchaty, Orlando, FL (US)

(73) Assignee: Lockheed Martin Corporation, Bethesda, MD (US)

(*) Notice: Subject to any disclaimer, the term of this patent is extended or adjusted under 35 U.S.C. 154(b) by 166 days.

(21) Appl. No.: 12/276,233

(22) Filed: Nov. 21, 2008

(65) Prior Publication Data

US 2010/0127174 A1  May 27, 2010

(51) Int. Cl.
*G01J 5/02* (2006.01)
(52) U.S. Cl. .................................. 250/339.02
(58) Field of Classification Search ........... 250/339.01, 250/339.02, 339.05, 370.01, 370.08, 394
See application file for complete search history.

(56) References Cited

U.S. PATENT DOCUMENTS 7,183,966 B1 * 2/2007 Schramek et al. ............. 342/53
2006/0055800 A1 * 3/2006 Ackland et al. ............. 348/308

* cited by examiner

*Primary Examiner*—David P Porta
*Assistant Examiner*—Mark R Gaworecki
(74) *Attorney, Agent, or Firm*—Birch, Stewart, Kolasch & Birch, LLP (57) ABSTRACT

A multi-mode detector and detection method that utilize shared optical components to detect multiple different incoming wavelengths of energy. Partial de-focusing of incoming light enables imaging and non-imaging outputs from the same detector. Analog and digital pixels enable mixed-mode output. Selective filtering at the detector enables the simultaneous detection of two or more wavelengths of light. Signal processing hardware and algorithms enable the system to simultaneously provide integrated and multi-channel analog outputs to guidance and display systems.

30 Claims, 9 Drawing Sheets

FPA COMBINING SAL AND IMAGING

TECHNICAL FIELD OF THE INVENTION

The present invention relates to the detection of disparate-wavelength signals with a single detector. Specifically, the present invention relates to the detection of semi-active laser (SAL) and infra-red signals using a single focal plane array (FPA). The invention further relates to providing simultaneous mixed read-out methods on a single ROIC.

BACKGROUND

Multi-mode sensors have become an important component in precision-guided munitions. To ensure accuracy and proper target acquisition, it has become increasing more useful to have multiple ways of detecting and tracking a potential target.

One common example of a multi-mode device is a missile seeker that combines mid-wave infra-red imaging capability and semi-active laser detection and tracking. The infra-red allows for tracking based on emitted heat or expected heat signature of a target, while a semi-active laser (SAL) detector allows the munition to home in on a target being 'painted' with a laser spot. The combination of the two creates a more robust and fault-tolerant seeker system that is less likely to be confused by counter-measures and capable of proving greater accuracy and operating in a wider range of environments.

With all of these advantages, there come several downsides to a multi-mode detector device. Generally, such devices require two disparate sensor systems whose outputs are combined and analyzed to give a true multi-mode detection capability. This causes such systems to generally be costly and complicated, limiting their use in the field. A multi-mode detection system that could take advantage of common components to provide multi-mode detection data from a single set of optics and detection components would offer the combined benefits of simplicity and cost reduction. A simpler device with fewer components is less likely to break or malfunction, and a lower-cost device can be more broadly applied. This is especially true in the realm of guided munitions, where the entire device is meant for single use in a high-impact operating environment. The advantages of a cheaper, simpler multi-mode detector for such applications should be readily apparent.

SUMMARY

The present invention seeks to solve the aforementioned problems by providing a multi-mode detector that utilizes shared optical components to detect multiple different incoming wavelengths of energy. Selective filtering at the detector enables the present invention to simultaneously detect two or more wavebands of light. Signal processing hardware and algorithms enable the system to simultaneously provide integrated and multi-channel analog outputs to guidance and display systems.

One embodiment of the present invention is as an imaging device for multiple-waveband detection, where the device consists of a focal plane array (FPA) and a waveband filter array situated directly on the focal plane array. The waveband filter of this embodiment has a 'checkerboard' pattern with each 'square' of the pattern covering a pixel of the focal plane array. Each of these squares is designed to permit a one of a set of specific wavelength ranges, with each square covering one or more pixels. In one particular embodiment, the specific waveband ranges are mid-wave infra-red (MWIR) wavelengths and semi-active laser (SAL) wavelengths. Other embodiments may use different wavebands, different patterns, and may employ more than two wavebands.

The FPA in this embodiment may comprise an InSb staring focal plane detector divided into four quadrants. The four-quadrant approach may be useful in tracking devices or missile seekers where the direction of incoming light may be ascertained based on its distribution and intensity over the quadrants. The present embodiment may also employ a beam spoiler to de-focus incoming light at SAL wavelengths so that it will cover a wider area on the FPA, allowing for more proportional control over wide angles of incidence.

Other embodiments of the present invention may include multi-mode threat detectors such as devices intended to detect if someone is using one of several active imaging methods to sweep a target area. Other embodiments of the invention may employ PIN photodiodes or APDs (avalanche photodiodes) instead of, or in addition to, the FPA, or use a different form of CCD (charge-coupled device), or may use different filtering techniques, such as magneto-optical filters.

Regardless of the underlying hardware, the fundamental inventive concepts are enabling the simultaneous detection of two or more wavelengths with a shared set of optical components and simultaneously providing both analog and integrated output. In the case of an FPA detector with a 'checkerboard' waveband filter, this may be accomplished by filtering the incoming light before it is detected by the FPA, capturing the output signal from each quadrant on a separate output channel, and filling gaps in the output signal of each quadrant with an extended-range image processing technique embodied on a high-speed readout integrated circuit.

Other inventive embodiments may require different signal capture and processing techniques due to different filtering, detection, or data output hardware. The imaging resolution may also be affected by different detector hardware, potentially allowing for effective visual-image capture, or for the elimination of post-detection image processing intended to gap-fill or otherwise compensate for resolution loss or image under-sampling as a result of waveband filtering.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

FIGURES

The present invention will become more fully understood from the detailed description given hereinbelow and the accompanying drawing which is given by way of illustration only, and thus is not limitative of the present invention, and wherein.

The drawings will be described in detail in the course of the detailed description of the invention.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

In order to reduce the cost of detector components while preserving functionality, the present invention seeks to provide multiple-wavelength light detection and imaging capabilities using a single set of detector hardware.

Figure 1A:
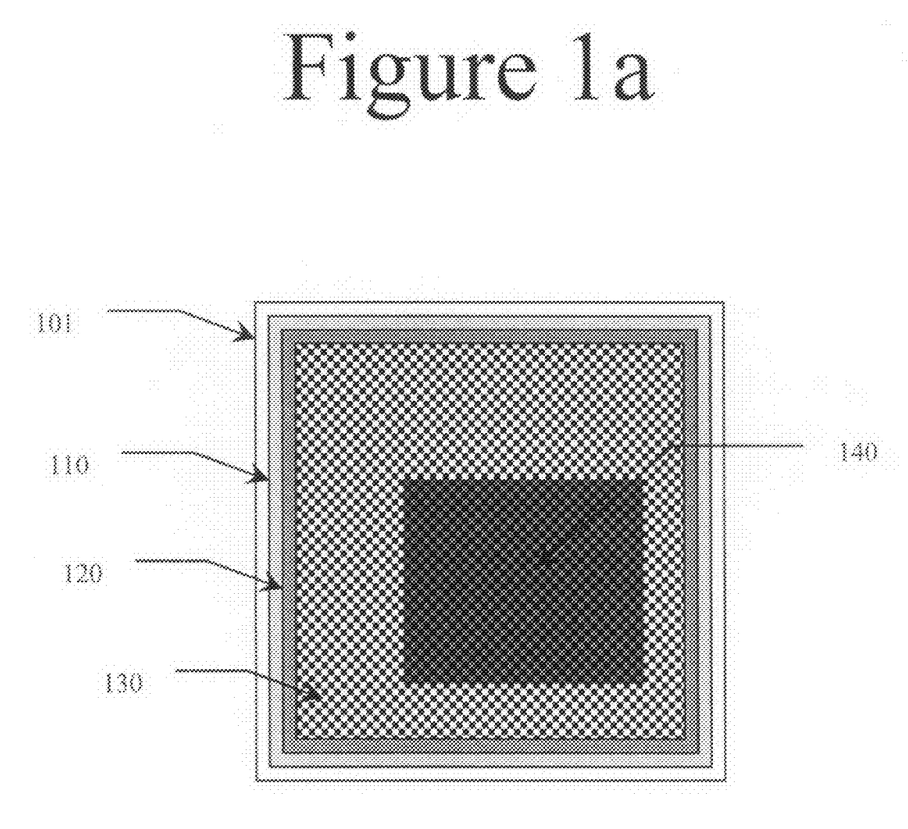
FIG. 1a shows an embodiment of an FPA-type detector with a 'checkerboard' waveband filter and a de-focused image signal.

In a missile-seeker embodiment of the inventive concept, redundant and duplicate components in a multi-mode missile seeker are eliminated through the use of a four-quadrant focal plane detector overlaid with a 'checkerboard' waveband filter, with each quadrant having a separate analog output channel. This focal plane array (FPA) detector design, shown in FIG. 1 a, uses a patterned filter 130 that covers each pixel of the FPA with a waveband filter area. Half of the pixels in this embodiment are filtered to detect only wavelengths associated with mid-wave infra-red light (MWIR) and are used for imaging, and the other half are filtered to detect only the wavelengths associated with semi-active laser (SAL) targeting systems and are used to produce analog output.

Other embodiments of the inventive concept may be filtered to detect visible light and ultra-violet light, and may have different types of waveband filter masks such as ones using larger filter block sizes or different filter area patterns (e.g. triangles or a honeycomb), or may use an entirely different form of filtering altogether—such as magneto-optical filters. Other embodiments of the inventive concept may employ different forms of detectors, such as PIN photodiodes or APDs. Other embodiments of the inventive concept that use an FPA may dispense with the four quadrant system and either use one output channel for the entire FPA or divide the FPA some other way—such as into eighths or fifths. Yet other embodiments may use polarization filtering on groups of pixels, either instead of or in addition to spectral filtering. In such embodiments it may be advantageous to break the FPA up into many pixel groups, with each group of anywhere from 4 to 400 pixels having a separate output channel. Still further embodiments of the invention may dispense with spectral filtering altogether and instead rely on red spike and blue spike detection to differentiate between things like mid-wave and long-wave infra-red signals.

For the purposes of this specification and the attendant claims, "analog pixels" refer to those pixels that are used to produce analog output and "imaging pixels" refer to those pixels that are used for imaging. No structural or material difference between the two pixel types is required as far as the detector portion of the FPA is concerned, but certain embodiments may employ different pixel shapes or materials for the two pixel types.

In a missile-seeker embodiment, one of the concerns is cost control. One embodiment of a multi-mode missile seeker may give a munition the capability of augmenting a directed target acquisition approach through SAL by allowing for autonomous target acquisition through electro-optical (EO) imaging with mid-wave infra-red (MWIR). While making the missile more effective and enabling it to better locate and retain targets, the need for two detection systems—one for MWIR and one for SAL—increases the cost of the detector and therefore of the missile. By allowing the SAL and EO detection wavelengths to share a single detector, the component cost of the missile-seeker decreases, decreasing the overall cost of the missile while still allowing for multi-mode target acquisition.

As shown in FIG. 1a, a patterned waveband filter 130 may be applied over the pixels in the detector array 120. This limits the wavelengths of light that are allowed to contact the detector array 120 and cause it to pass an electrical signal to the read-out integrated circuit (ROIC) 110 mounted on the substrate 101. Embodiments of waveband filters may be patterned to cover individual pixels with different filter areas, or may spread a filter area across groups of pixels. Also, the pixels in the detector are not all required to be of identical shape and size, so an associated patterned waveband filter may further reflect any variation in pixel size of its underlying detector.

Figure 1B:
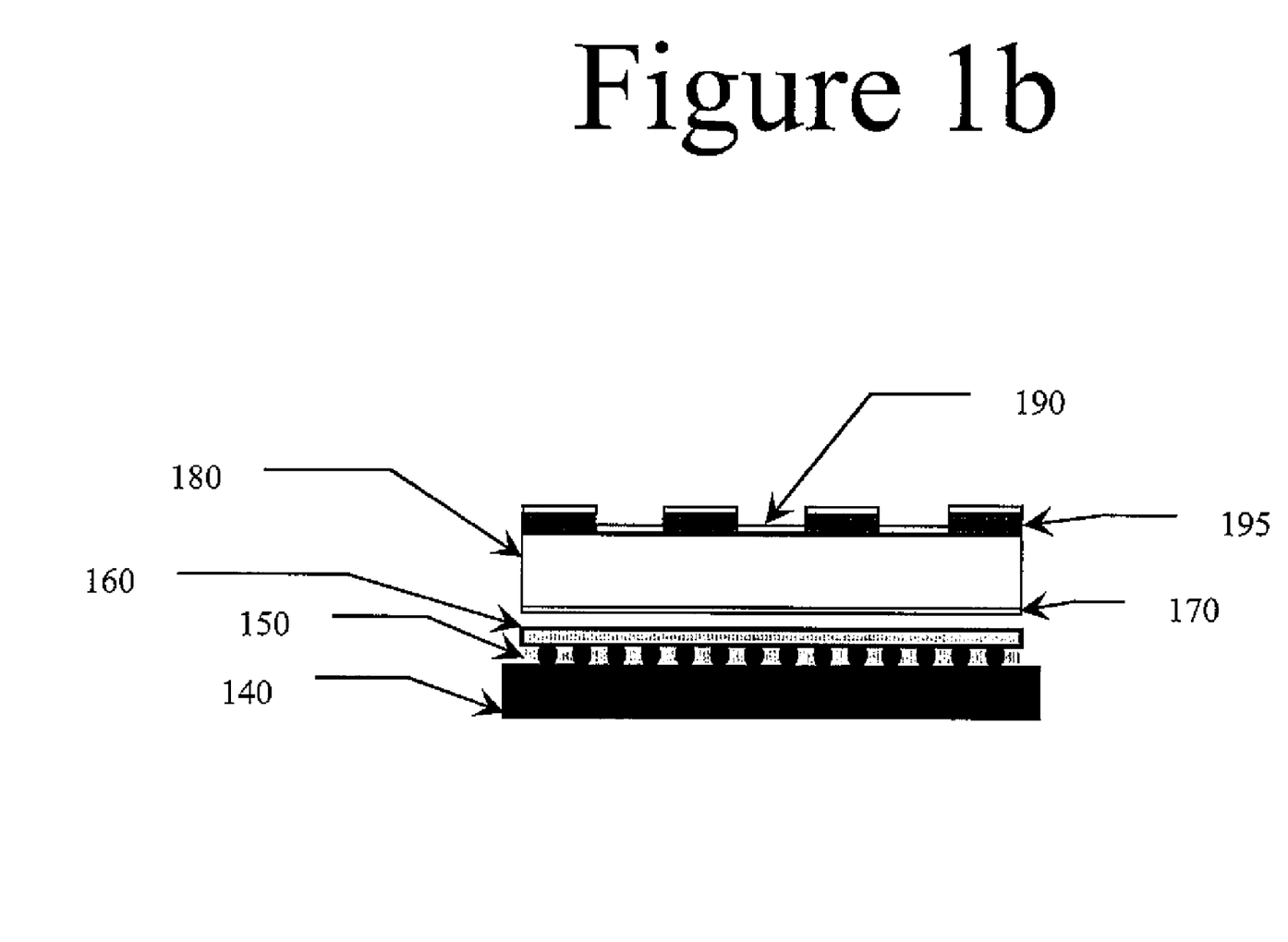
FIG. 1b shows a side-view of an embodiment of an FPA-type detector with a 'checkerboard' waveband filter.

A side-view of a particular embodiment of an FPA detector with a patterned waveband filter, shown in FIG. 1b, shows an embodiment of a checkerboard-type filtering pattern. As in a conventional FPA, the silicon ROC 140 is connected to the detector array 160 with a combination of epoxy and indium interconnects 150. The patterned waveband filter rests on top of the detector array 160. The filter is composed of a transparent substrate 180 (by transparent, it is meant that the substrate is transparent to those wavelengths admitted by the filter—visible-spectrum transparency is not necessarily essential or desirable) which, in this embodiment, is sandwiched by top and bottom anti-reflective coatings 170 190. The waveband filter portion, 195 is patterned on top of the transparent substrate 180 and, in some embodiments, the top anti-reflective coating 190 may have additional or inherent waveband filtering capabilities as well. The areas with the waveband filter 195 only admit one particular waveband of photons, whereas the areas with only the anti-reflective coating 190 may admit a broader waveband. The waveband filters may each have a different waveband of light that they will admit, and the areas depicted as only covered with an anti-reflected coating 190 may, in other embodiments, also be covered with different types of waveband filters.

Figure 1C:
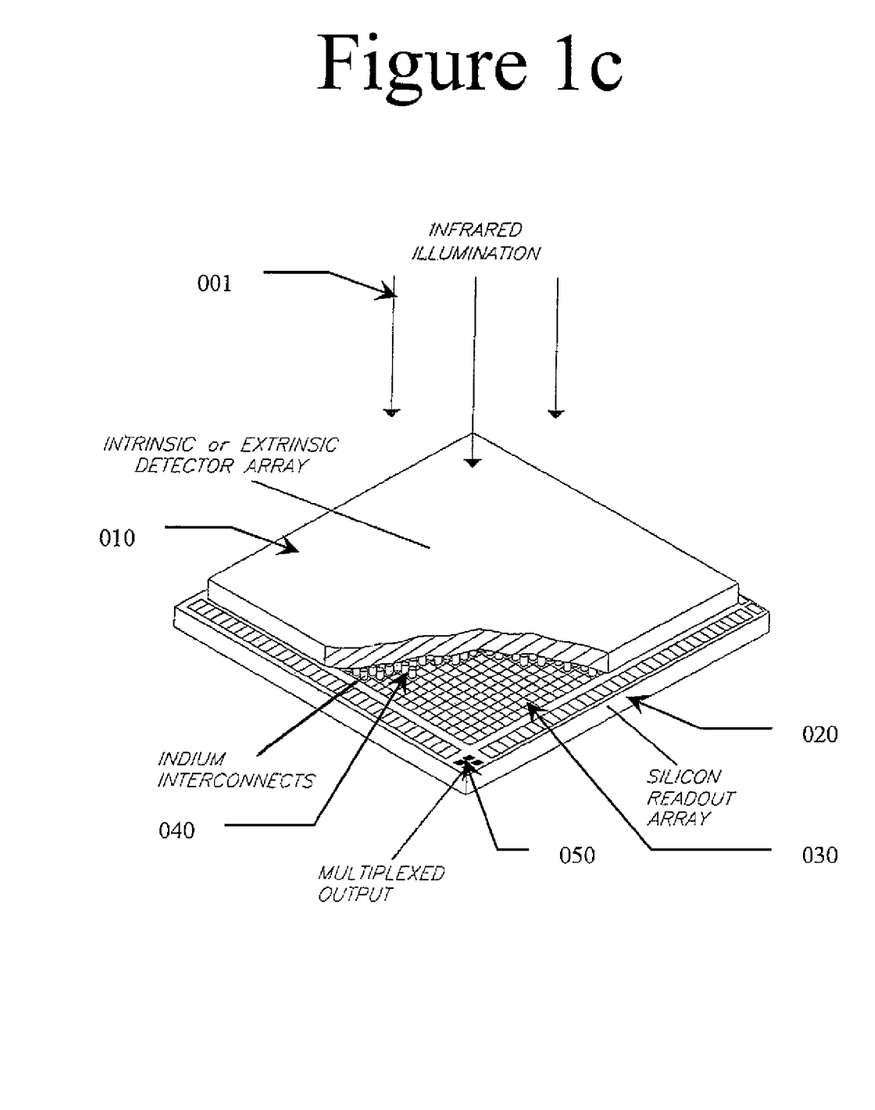
FIG. 1c shows a prior art FPA-type detector for infrared detection.

Before proceeding further, it may be helpful to review how an FPA detector operates so that the distinguishing features of the present invention can be better understood. Referring to FIG. 1c, an FPA-type detector typically comprises an extrinsic or intrinsic detector array 010. This detector array may be made of a wide range of materials, including GaAs (gallium-arsenide) and InSb (indium-antimonide). The detector array may be a continuous layer of material, or it may be composed of pixels of the detector material, with each pixel on the detector array corresponding to one pixel of image resolution. A 600×800 detector array, therefore, has 48,000 pixels and can produce an image of up to 600×800 screen resolution. Each pixel in the array is a 'collection hole' that absorbs incident photons and produces an electric charge relative to the amount and intensity of the photons absorbed. The detector material may be covered with an anti-reflective coating to improve its detection characteristics. The particular embodiment of an FPA detector depicted here is meant to detect incoming infrared radiation 001. The detector array 010 is connected to an ROIC (read-out integrated circuit) array 030, which is printed on a substrate—typically made of silicon 020. The detector array 010 is connected to the ROIC 030 through interconnects 040 that match each pixel of the detector array 010 to a point on the ROIC array 030. In this embodiments, the interconnects are made of indium 040 because it is suitable for cold-welding and cold-temperature operation. The input to the ROIC array elements 030 is then multiplexed before being output 050 for further signal processing and image display. This integrated, multiplexed output 050 combines the individual inputs to the ROIC array 030 into a single, cohesive image signal suitable for subsequent image processing and analysis.

An FPA detector of this type produces integrated, multiplexed image output 050 by combining all of the pixel-level signals in a given column, and then combining the columns. An example of how this operation is carried out is shown in FIG. 2*b*.

In the detector 401, an incident photon creates a charge in a pixel 405. This charge is transferred to the ROIC 420 and integrated in the integration capacitor 427 over a set period of time. The Reset switch 429 is then opened to stop integration and the integrated current moves to a holding capacitor 423. The Hold switch 421 is then opened to stop the flow of current between the capacitors, and the integration capacitor charge 427 is cleared and the Reset switch 429 closed to begin integrating charge from the pixel again. The hold capacitors 423 of all pixels in a given row feed into a column bus 410 when the Multiplexing switch is closed 425, and the column buses are then further multiplexed together (not shown) when the Multiplexing switch 425 to stop charge transfer from the hold capacitors. This set of operations repeats every set time period, which determines what the frame rate of an FPA is. The higher the frame rate, the more quickly the FPA is able to move charge from a pixel to the ROIC, integrate the pixel outputs, and produce an image signal.

The present invention has discrete areas of non-imaging, analog pixels on the FPA that are connected to additional components in the ROIC for the purpose of generating non-sampling, analog ouput. In a missile-seeker embodiment of the present invention, this would be the SAL data, and it may be used for target tracking, range-finding, and trajectory adjustments. An embodiment of a four-quadrant SAL-detecting FPA detector according to the present invention is depicted in FIG. 2*a*, and non-sampling analog output generation from an FPA is depicted in FIG. 2*c*

Figure 2A:
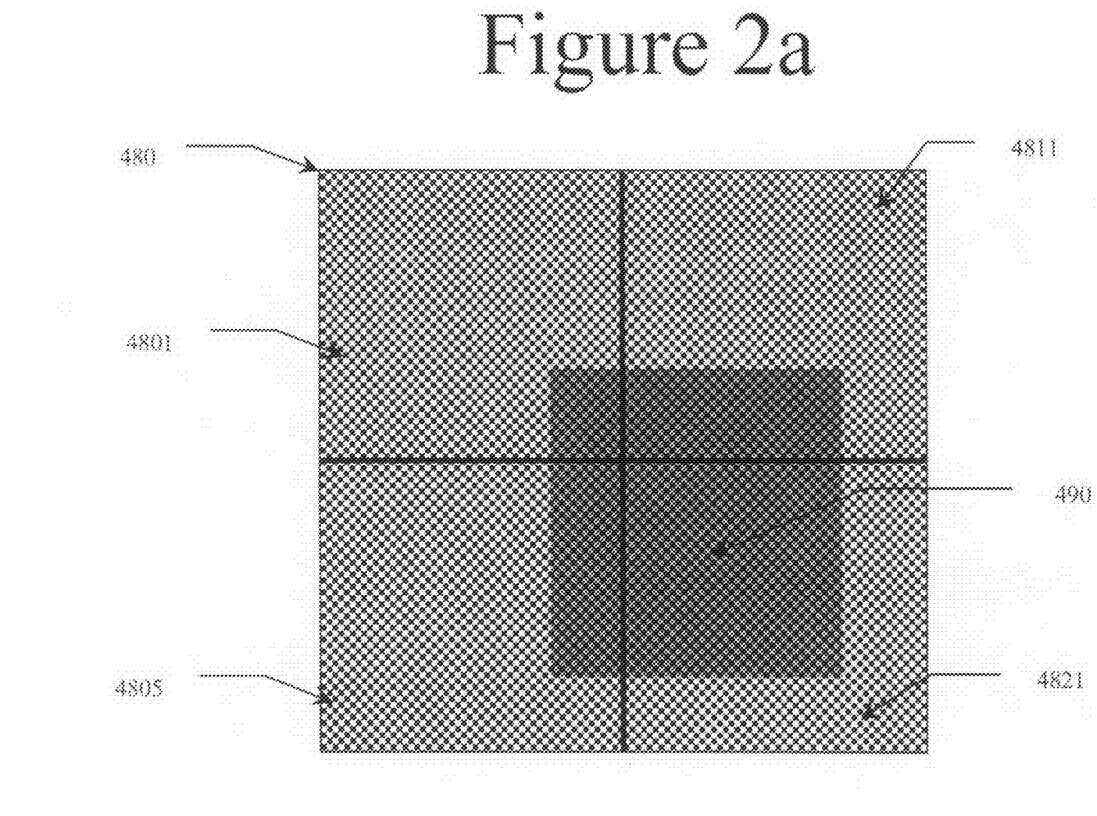
FIG. 2a shows an embodiment of a four-quadrant FPA detector according to the present invention.
Figure 2B:
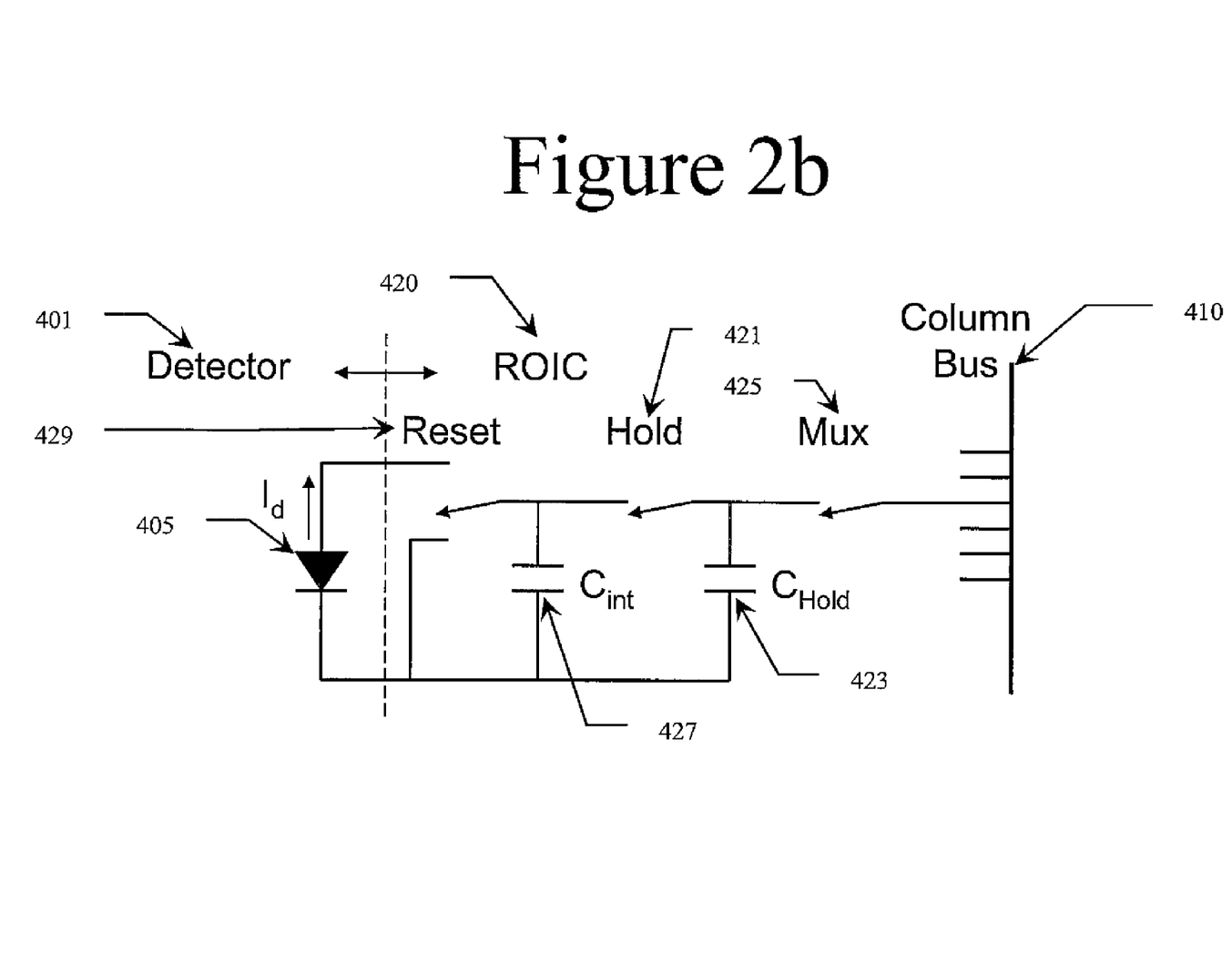
FIG. 2b shows an embodiment of an image signal detection portion of a multi-mode detector according to the present invention.
Figure 2C:
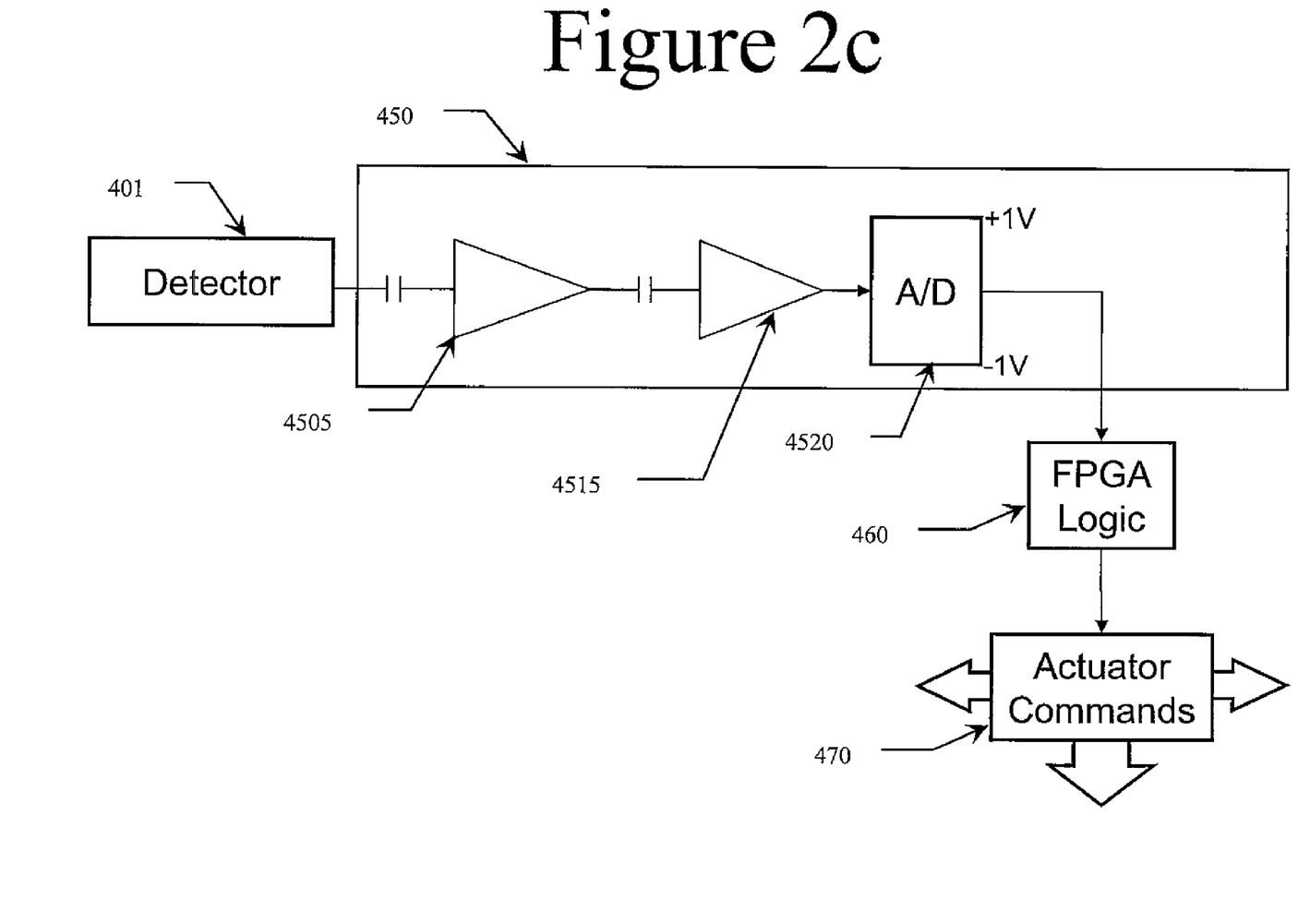
FIG. 2c shows an embodiment of an analog channel signal detection portion of a multi-mode detector according to the present invention.

As shown in FIG. 2*a*, the FPA detector array 480 is divided into four quadrants 4801, 4805, 4811, 4821 that each have a separate analog output channel. In this SAL/MWIR missile seeker embodiment, each channel of non-sampling, analog detector output 401 is converted into a digital signal 450 and then processed in an FPGA logic circuit 460 to determine first pulse or last pulse logic.

Alternative embodiments of the present invention may have more or fewer channels. One embodiment may have a separate channel for each analog pixel such that each analog output channel is eventually combined into a single overall analog output signal that can be used for subsequent tracking, control, or ranging operations.

The present embodiment of thethe conversion process for an output channel begins with a two step filtering and amplification process by a pair of A/C coupling detectors 4505, 4515. The filtering and amplification process strips out background and ambient noise in the signal, which may be caused by sunlight and ambient light. Other embodiments of the present invention may employ a single-step filtering and amplification process, additional filtering and amplification processes, or may dispense with this step entirely. Yet further embodiments of the present invention may accomplish signal filtering and amplification using different types of components. Still other embodiments of the preset invention may dispense with signal filtering and conversion process altogether, working instead with the pure analog output of the FPA channels. The amplification, filtering, A/D conversion, and other signal processing may be performed in the ROIC unit cell, may be performed by external circuitry, or may be a combination of ROIC and external circuits.

In the present embodiment, after filtering and amplification, the signal passes into an Analog to Digital converter 4520 to convert the analog channel output into a digital signal suitable for further processing by the FPGA 460. The FPGA encompasses the logic to acquire the and track the laser pulse in the presence of noise and clutter, sense PIM codes, reject countermeasures, perform M out of N pulse correlation to improve detection in poor SNR conditions, compute target centroid based on signals from each quadrant, and compute guidance and control commands to maneuver the airframe.

In the embodiment described, the separate channel signals are combined after FPGA processing (not shown) and then translated into actuator commands that direct the canards of a missile based on the relative centroid location of a de-focused laser sport detected by the multi-mode FPA. Alternative embodiments of the present invention may multiplex the analog output channels and have one set of amplification, filtering, and AID conversion hardware 450 for the multiplexed signal. In such embodiments, the FPGA 460 would have to demultiplex the separate channel signals in order to properly process and threshold them. Alternative embodiments of the FPGA may also entail a range-finder aspect where the laser pulses are analyzed to determine distance from the target.

Alternate embodiments of the present invention may dispense with FPGA processing. This may be accomplished in embodiments that use pure analog signal processing, or that employ wavelengths other than SAL for analog signal detection aspects. Alternative wavelengths include radio-frequency and millimeter-wave radiation bands, and analog signal processing may include techniques such as marking each channel output with an identifying characteristic so that simply comparing signal intensities across channels and over time provides centroid and range information.

In an embodiment of a detector according to the present invention where the desired wavebands are in the SAL (semi-active laser) and MWIR (mid-wave infrared) ranges, the two incoming light signals serve different purposes and are processed differently. In a missile-seeker embodiment of an SAL/MWIR multi-mode detector according to the present invention, it may be advantageous to de-focus part of the incoming light signal before it is detected by the FPA. This de-focusing may be accomplished by a beam spoiler device of the type depicted in FIG. 3. In the embodiment shown, incoming light in both MWIR 205 and SAL 211 wavelengths enters a sensor through a window 201 and passes into a cassegrain-type reflector arrangement. The main reflector 225 directs the MWIR 205 and SAL 211 light to a secondary cassegrain reflector 221 made of a dichroic material that reflects the MWIR 205 through refractive optics 235 that direct the light signal onto the detector array of the FPA 231. The SAL 211 light passes through the dichroic 221 and reflects off an SAL spoiler 215 that de-focuses the SAL 211 light, so that the SAL signal will appear on the FPA detector array as a large, de-focused spot 140.

Figure 3:
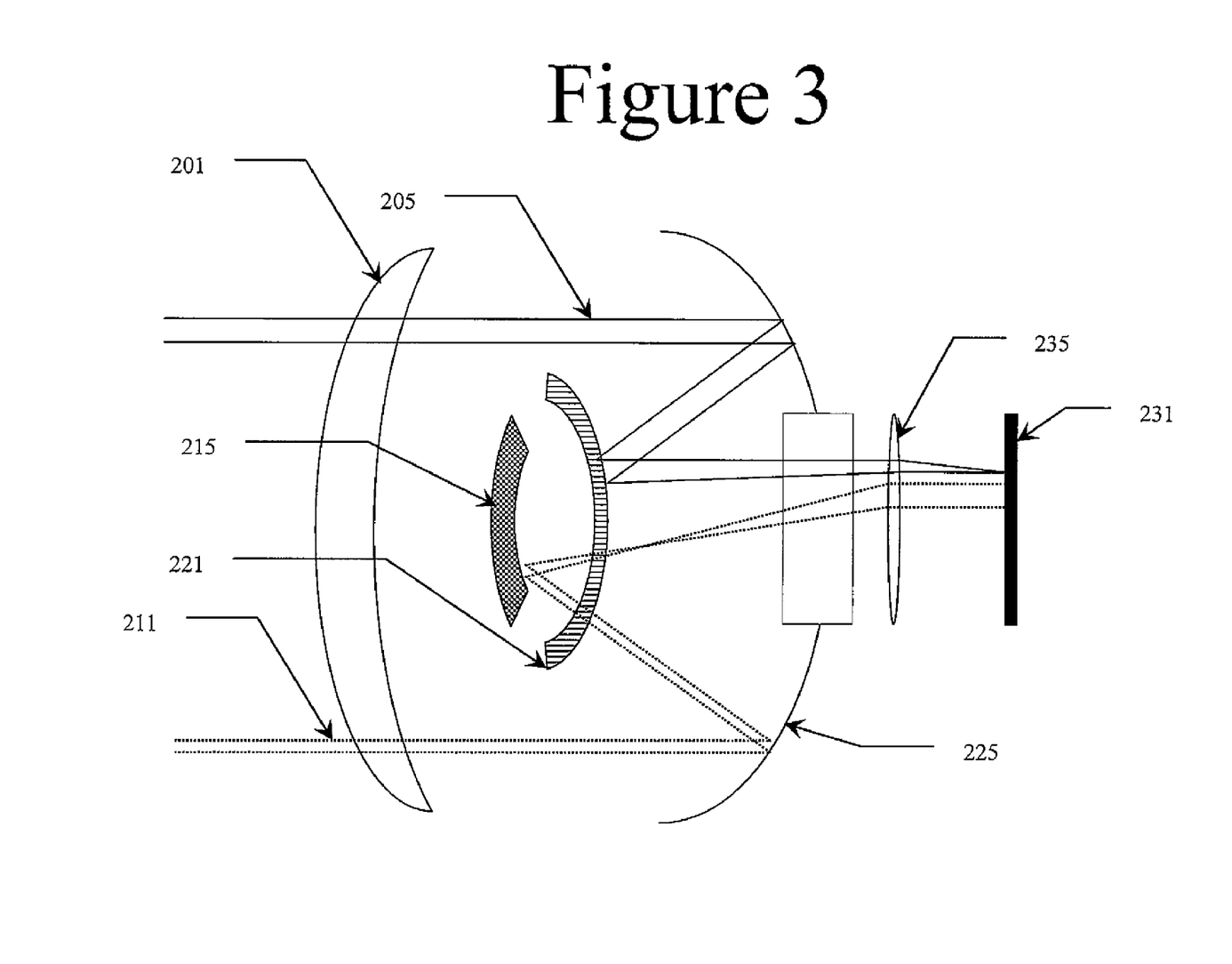
FIG. 3 shows an embodiment of a beam spoiler to de-focus portions of an incoming light signal according to the present invention.

De-focusing an SAL beam serves two purposes in a multi-mode missile seeker embodiment of the present invention. First, a tightly-focused SAL beam may be blocked if it is concentrated on an imaging pixel, causing no detection at all. De-focusing the beam ensures that it will be detected by multiple analog pixels. Second, in a multi-quadrant FPA embodiment, a highly focused SAL beam may only fall in one quadrant, making it difficult to determine the direction of the incoming beam with any precision. De-focusing the beam so that it crosses quadrants 490 allows for a more precise determination of beam direction because rationing the signal amplitude in each quadrant to the others provides a signal proportional to the signal centroid location on the FPA. Embodiments of a multi-mode missile-seeker according to the present invention may also slightly de-focus the MWIR signal before sampling in order to eliminate issues such as aliasing during image detection. For a more comprehensive treatment of processing under-sampled images, please see published U.S. patent application Ser. No. 11/429,958, the contents of which are hereby incorporated by reference.

Alternative embodiments of the inventive concept may use a different kind of beam spoiler, such as holographic surfaces, diffractive optics, curved mirrors, or reflect-arrays or may instead seek to more tightly focus portions of the beam through devices such as microlens arrays. Such an approach may be useful in variants of the MWIR/SAL multi-mode missile seeker embodiment of the present invention where a highly focused MWIR image may be desirable. Yet other embodiments may not employ any form of beam focus or de-focus, merely using the minimum set of optics required for light capture and transmission to the FPA. Yet further embodiments of the invention may employ a refractive holographic element instead of a beam spoiler device, such as a hologram of a prism. This may accomplish beam spreading and signal uniformity without requiring a larger and more mechanically complex beam spoiler device.

In a missile-seeker embodiment having a beam spoiler, the de-focused light beam may then be detected by a staring FPA with a patterned waveband filter of a type described above. Alternative embodiments may employ further signal processing techniques, such as wavelength shifting, magneto-optical filtering, or light intensification before allowing incoming light to register on a detector. Such techniques may be useful in embodiments meant to operate in low-light environments for things such as simultaneous visible and ultra-violet detection, embodiments seeking to detect light wavelengths associated with the combustion of specific elements or compounds (such as magnesium or thermite) as well as provide general MWIR detection.

Alternative embodiments of the present invention may also employ various shapes and sizes for the analog channel areas. An embodiment meant to provide range-finding and imaging capability on the same FPA may have a large area in the center of the FPA set as a 'super pixel' with a single analog channel output so that it can detect incoming laser signals and determine how far it is from the target. This may be accomplished, for instance, by having four separate imaging quadrants on an FPA with a 'plus-sign' shaped area between them acting as a large laser detection analog pixel for range-finding. An embodiment intended for simultaneous, multi-mode detection of MWIR and SAL light may have alternating waveband filter squares designed to pass only wavelengths of between 3 and 5 μm and 1.06 and 1.57 μm, respectively. Such an embodiment of a waveband filter accomplishes waveband filtering by reflecting or absorbing radiation outside of the desired wavebands. This can be achieved through a selection of filter materials that only pass the bands of interest, or through prisms, diffraction gratings, or anti-reflective coatings.

The MWIR portion of incoming light is also detected by this FPA embodiment, and the gaps created through the omission of every other pixel (due to a combination of the waveband filter mask and ROIC circuitry) are filled in by an extended-range image processing technique of a type disclosed in U.S. patent application Ser. No. 11/429,958—the contents of which are hereby incorporated by reference. The MWIR signal is detected through a standard FPA integration/multiplexing technique depicted in FIG. 2b.

Alternative embodiments of the inventive concept may employ different methods for separately processing the multiple types of input detected by a multi-mode detector. Possible alternatives include charge injection devices, digital ROICs, any other variations of detection devices capable of providing multi-channel analog output in addition to integrated image signal output.

Figure 4A:
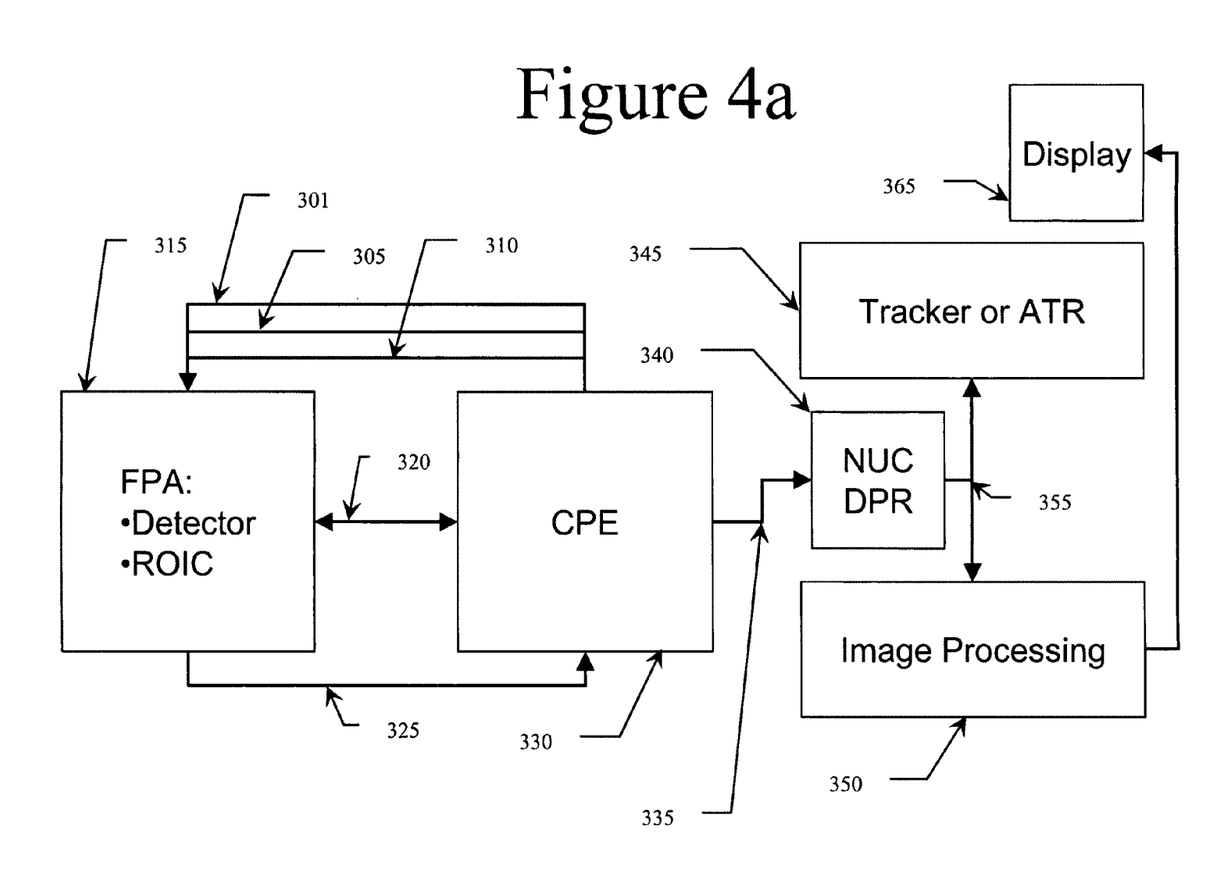
FIG. 4a shows an embodiment of the imaging components of a multi-mode target acquisition and imaging device according to the present invention.

FIG. 4a shows the imaging portion of an embodiment of a multi-mode missile seeker device that provides both target imaging and target tracking capabilities using a sampled, imaging output, and a non-sampled, analog channel output. The FPA 315, which contains both the detector with a patterned waveband filter and the ROIC with the added analog channel outputs, is operatively connected to a controller 330 that governs the operating mode of the FPA 310, feeds in a power signal 305, and feeds in a timing signal 301. The controller also monitors FPA temperature and controls cooling of the FPA unit 320. The signal output of the FPA 325 is fed through the controller 330 to a calibration and processing unit 340. The signal coming from the controller 335 contains the multiplexed imaging output of the FPA. The calibration and processing unit 340 may direct the imaging signal 355 to an image processing unit 350, and subsequently to a display unit 365. The signal 355 may also be directed to a tracking and target recognition system 345 which analyzes the imaging portion of the signal for known or readily ascertained targets and performs further processing and subsequent target tracking, or missile course correction based on the detected location of the target in the imaging plane.

Figure 4B:
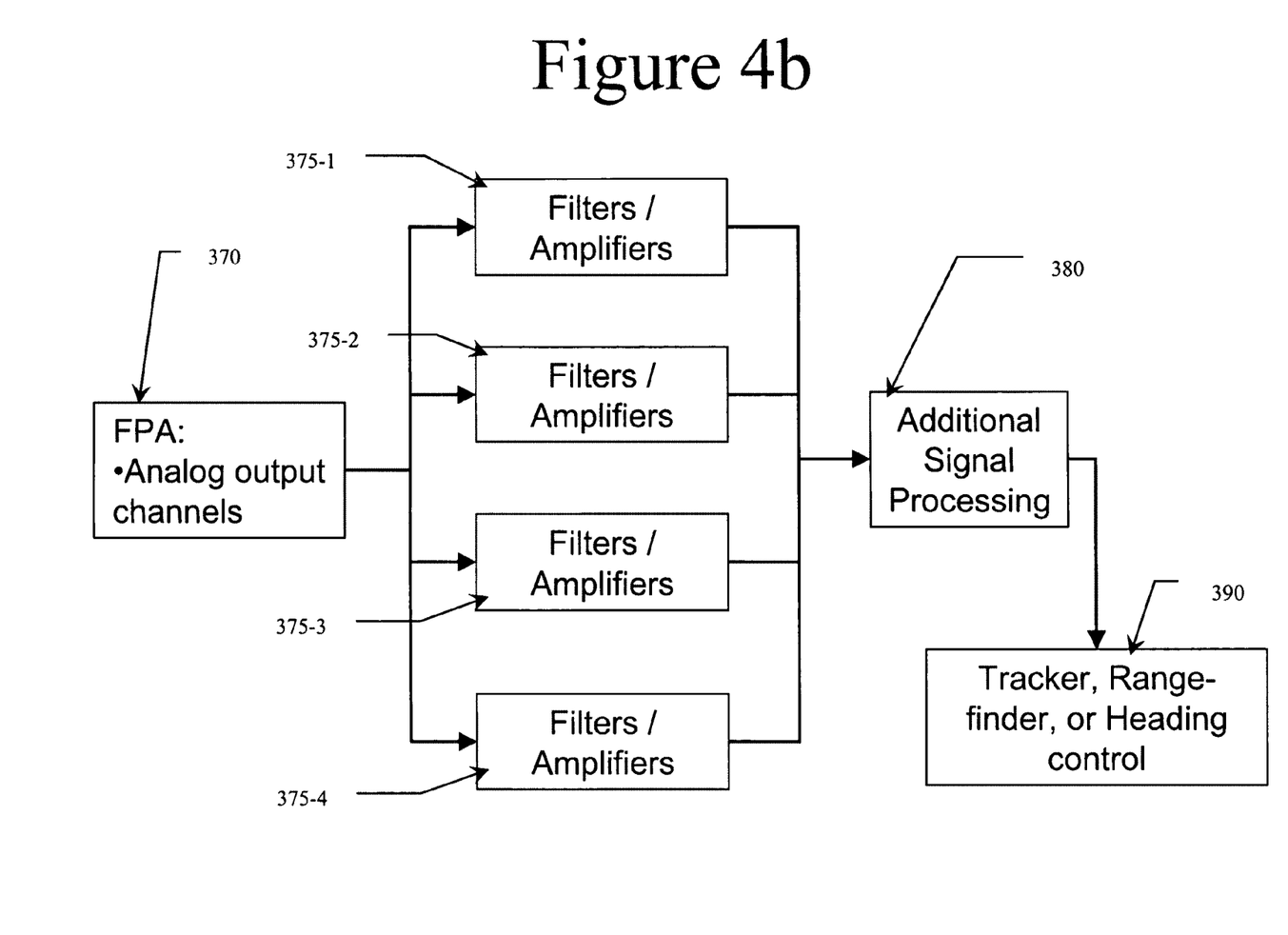
FIG. 4b shows an embodiment of the analog signal detection and control components of a multi-mode target acquisition and imaging device according to the present invention.

FIG. 4b shows the analog signal detection portion of an embodiment of a multi-mode missile seeker device that provides both target imaging and target tracking capabilities using a sampled imaging output and a non-sampled analog channel output. This embodiment of the FPA 370 contains four analog output channels that correspond to four quadrants of analog detection on the FPA. Alternative embodiments may contain more or fewer analog channels, up to a separate channel for each analog pixel on the FPA. Each analog channel outputs a signal to a set of filters and amplifiers 375-1, 375-2, 375-3, 375-4. Each of these filter/amplifier sets may contain some or all of the components in the digital signal conversion aspect 450 of FIG. 2c. As shown there, each filter/amplifier portion may have one or more AC couplings to amplify the detected signal and filter out background noise, and may also have an AID converter to generate digital output.

Alternate embodiments of the present invention may dispense with the A/D converter aspect entirely and employ a purely analog signal output. Yet further alternative embodiments may embed the filter/amplifier aspect into the ROIC of the FPA device. In one possible embodiment, each analog pixel may be operatively connected to a separate AC coupling or set of AC couplings for pixel-level analog signal filtering.

After filtering and amplification, the analog signal or signals may be sent for further signal processing 380. This processing may include combining disparate analog channel outputs into a single signal, de-multiplexing a cross-channel multiplexed analog output signal, or processing either combined or separate signals without combining or dividing them. In the present invention, this additional signal processing 380 may include A/D conversion and FPGA analysis, or may simply include basic cross-channel signal comparisons to determine either a range or centroid location of the analog signal source. This processed signal is then passed on to any number of subsequent devices 390 including controllers to adjust things like steering/guidance fins to make missile heading corrections, timing and detonation control devices to determine range-based warhead detonation parameters, or, in some embodiments, into a target tracking system that may dynamically adjust the integration time of the imaging aspect based on properties of the analog signals. Such an embodiment would enable variable frame-rate imaging that could adaptively increase integration time for improved resolution or decrease integration time for improved frame rate based on things like relative target speed and proximity and heading.

The present invention is not limited to MWIR/SAL multi mode missile seekers, and is not limited strictly to two-mode detector devices. Multiple foul's of analog channel output and sampled imaging output may be maintained on the same FPA device. Spectral filtering may be eliminated altogether or replaced with polarization filtering and possible alternative embodiments may include an MWIR/SAL/visible spectrum multi-mode detector that provides MWIR and visible spectrum imaging as well as SAL range-finding and orientation on the same FPA. Yet other alternative embodiments may employ variants such as eye-safe and non eye-safe laser detection on different sets of FPA sections and associated channels.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. An imaging device for simultaneous multiple-wavelength electro-optical radiation detection using a single detector, said device comprising:
   a detector that detects incoming photons, the detector being composed of pixels wherein the pixels comprise at least one imaging pixel and at least one analog pixel;
   a read-out integrated circuit operatively connected to the detector, wherein the read-out integrated circuit (ROIC) comprises:
      an imaging portion operatively connected to the at least one imaging pixel such that the imaging portion generates integrated digital imaging output from the at least one imaging pixel; and
      an analog output portion operatively connected to the at least one analog pixel wherein the analog output portion comprises at least one analog output channel generating non-sampled, analog output from the at least one analog pixel.

2. The imaging device of claim 1 further comprising:
   a patterned waveband filter disposed on top of the detector such that the waveband filter covers the pixels of the detector, wherein the waveband filter is comprised of distinct filter regions such that a filter region covers at least one pixel of the detector; and
   further wherein each distinct filter region corresponds to a specific electro-optical radiation (EOR) wavelength band, permitting radiation in that wavelength band to pass through that filter region for detection.

3. The imaging device of claim 2, wherein the detector further comprises a plurality of the imaging pixels and a plurality of the analog pixels where the imaging and analog pixels alternate on the detector in a checkerboard pattern; and
   further wherein the patterned waveband filter is in a checkerboard pattern that comprises alternating, pixel-sized areas of a first filter region and a second filter region, such that the imaging pixels are covered by areas of the first filter region and the analog pixels are covered by areas of the second filter region.

4. The imaging device of claim 3, wherein the wavelength band of the first filter region is mid-wave infra-red and wherein the wavelength band of the second filter region corresponds to wavelengths used in a semi-active laser system.

5. The imaging device of claim 1, wherein the detector further comprises four non-overlapping pixel regions such that each pixel region contains at least one analog pixel; and
   further wherein the analog output portion comprises four analog output channels such that an analog output channel is operatively connected to the at least one analog pixel of a pixel region.

6. The imaging device of claim 5, further comprising:
   a signal thresholding and logic device for analyzing the output of each analog channel wherein said thresholding and logic device comprises:
      a determining unit that determines whether a valid signal is detected; and
      a calculating unit that calculates the centroid of a valid incident signal.

7. The imaging device of claim 1, further comprising:
   a beam spoiler optically coupled to the detector, wherein the beam spoiler selectively de-focuses certain wavelengths of incoming electro-optical radiation (EOR) before they are projected onto the detector.

8. The imaging device of claim 7, wherein the beam spoiler selectively de-focuses EOR wavelengths associated with a non-imaging portion of an incoming signal.

9. The imaging device of claim 7, wherein the beam spoiler comprises a dichroic or holographic element.

10. The imaging device of claim 1, wherein the at least one analog pixel is a single analog pixel located in the center of the detector, and further wherein the analog pixel is in the shape of a 'plus' sign.

11. The imaging device of claim 1 further comprising:
   a patterned polarization filter disposed on top of the detector such that the polarization filter covers the pixels of the detector wherein the polarization filter is comprised of distinct filter regions such that each filter region covers at least one pixel of the detector; and
   further wherein each distinct filter region corresponds to a specific electro-optical radiation (EOR) polarization, permitting radiation of that polarization to pass through that filter region for detection.

12. The imaging device of claim 1, further comprising:
   at least one filtering and amplification module operatively connected to the analog output portion, wherein the filtering and amplification module filters out background noise from the analog output and amplifies the remaining signal.

13. The imaging device of claim 12, the at least one filtering and amplification module comprising an alternating-current coupling.

14. The imaging device of claim 13, wherein each non-imaging pixel of the detector has a separate output channel operatively connected to an AC coupling contained within the filtering and amplification module.

15. The imaging device of claim 12, wherein the filtering and amplification module is disposed within the ROIC.

16. The imaging device of claim 1, further comprising:
an adaptive integration timer operatively connected to the at analog output portion such that the analog output is used by the adaptive integration timer to adjust the integration time of the imaging pixels on the ROIC.

17. The imaging device of claim 1, wherein the at least one analog pixel comprises a component of a laser range-finder.

18. A method for simultaneous multiple-wavelength electro-optical radiation detection using a single detector, the method comprising:
detecting incoming photons with a detector, the detector being composed of pixels wherein the pixels comprise at least one imaging pixel and at least one analog pixel;
outputting detection results through a read-out integrated circuit (ROIL), wherein outputting detection results comprises:
generating integrated digital imaging output from the at least one imaging pixel with an imaging output unit; and
generating non-sampled, analog output from the at least one analog pixel with an analog output portion, wherein the analog output portion comprises at least one analog output channel.

19. The method of claim 18 further comprising:
filtering incoming photons with a patterned waveband filter comprised of distinct filter regions such that each filter region covers at least one pixel of the detector, wherein each distinct filter region corresponds to a specific electro-optical radiation (EOR) wavelength band, permitting radiation in that wavelength band to pass through that filter region for detection.

20. The method of claim 19, further comprising:
alternating imaging and analog pixels on the detector in a checkerboard pattern; and
covering the pixels of the detector with said patterned waveband filter such that the imaging pixels are covered by filter regions corresponding to a first EOR wavelength band and the analog pixels are covered by filter regions corresponding to a second EOR wavelength band.

21. The method of claim 20, wherein the wavelength band of the first filter region is mid-wave infra-red and wherein the wavelength band of the second filter region is semi-active laser.

22. The method of claim 18, further comprising:
selectively de-focusing certain wavelengths of incoming EOR before they are projected onto the detector.

23. The method of claim 22, wherein selectively de-focusing comprises selectively de-focusing EOR wavelengths associated with a non-imaging portion of an incoming signal.

24. The method of claim 18, further comprising:
thresholding and analyzing the output of each analog channel; wherein thresholding and analyzing further comprises
determining whether a valid signal is detected; and
calculating the centroid of a valid incident signal.

25. The method of claim 18, further comprising:
disposing the at least one analog pixel in the center of the detector; and
performing range-finding with said at least one analog pixel.

26. The method of claim 18 further comprising:
filtering incoming photons with a patterned polarization filter comprised of distinct filter regions such that each filter region covers at least one pixel of the detector, wherein each distinct filter region corresponds to a specific electro-optical radiation (EOR) polarization, permitting radiation of that polarization to pass through that filter region for detection.

27. The method of claim 18, further comprising:
filtering and amplifying the analog output with at least one filtering and amplification module, wherein filtering comprises filtering out background noise and amplifying comprises amplifying the remaining signal.

28. The method of claim 18, further comprising:
adjusting imaging integration time by using the analog output to determine an integration time for the imaging pixels on the ROIC.

29. The method of claim 18, wherein generating non-sampled analog output further comprises:
generating filtered and amplified non-sampled analog output from each non-imaging pixel; and
outputting the filtered and amplified non-sampled analog output from each non-imaging pixel on a separate output channel.

30. An imaging device for simultaneous multiple-wavelength electro-optical radiation detection using a single detector, said device comprising:
a detector that detects incoming photons, the detector being composed of pixels wherein the pixels comprise imaging pixels and analog pixels and further wherein the imaging and analog pixels are disposed on the detector in an alternating, checkerboard pattern;
a read-out integrated circuit operatively connected to the detector, wherein the read-out integrated circuit (ROIC) comprises:
an imaging portion operatively connected to the imaging pixels such that the imaging portion generates integrated digital imaging output from the imaging pixels; and
an analog output portion operatively connected to the analog pixels wherein the analog output portion comprises four analog output channels, each channel corresponding to a non-overlapping quadrant of the detector and generating non-sampled, analog output from the analog pixels in that quadrant;
a patterned waveband filter disposed on top of the detector, wherein the waveband filter is comprised of alternating, pixel-sized areas of first and a second filter regions, such that areas of the first filter region cover the imaging pixels of the detector and areas of the second filter region cover the analog pixels of the detector; and further wherein the first filter region corresponds to a first, imaging electro-optical radiation (EOR) wavelength band, permitting radiation in the first wavelength band to pass through the first filter region for detection, and the first second region corresponds to a second, non-imaging EOR wavelength band, permitting radiation in the second wavelength band to pass through the second filter region for detection;
a beam spoiler optically coupled to the detector, wherein the beam spoiler selectively de-focuses the non-imaging wavelengths of incoming EOR before they are projected through the filter and onto the detector; and
a filtering and amplification module operatively connected to the analog output portion, wherein the filtering and amplification module filters out background noise from the analog output and amplifies the remaining signal.

* * * * *